Dec. 18, 1962  R. D. PFLUGER ETAL  3,068,796
POWER LEVEL CONTROLLER
Filed Nov. 20, 1959
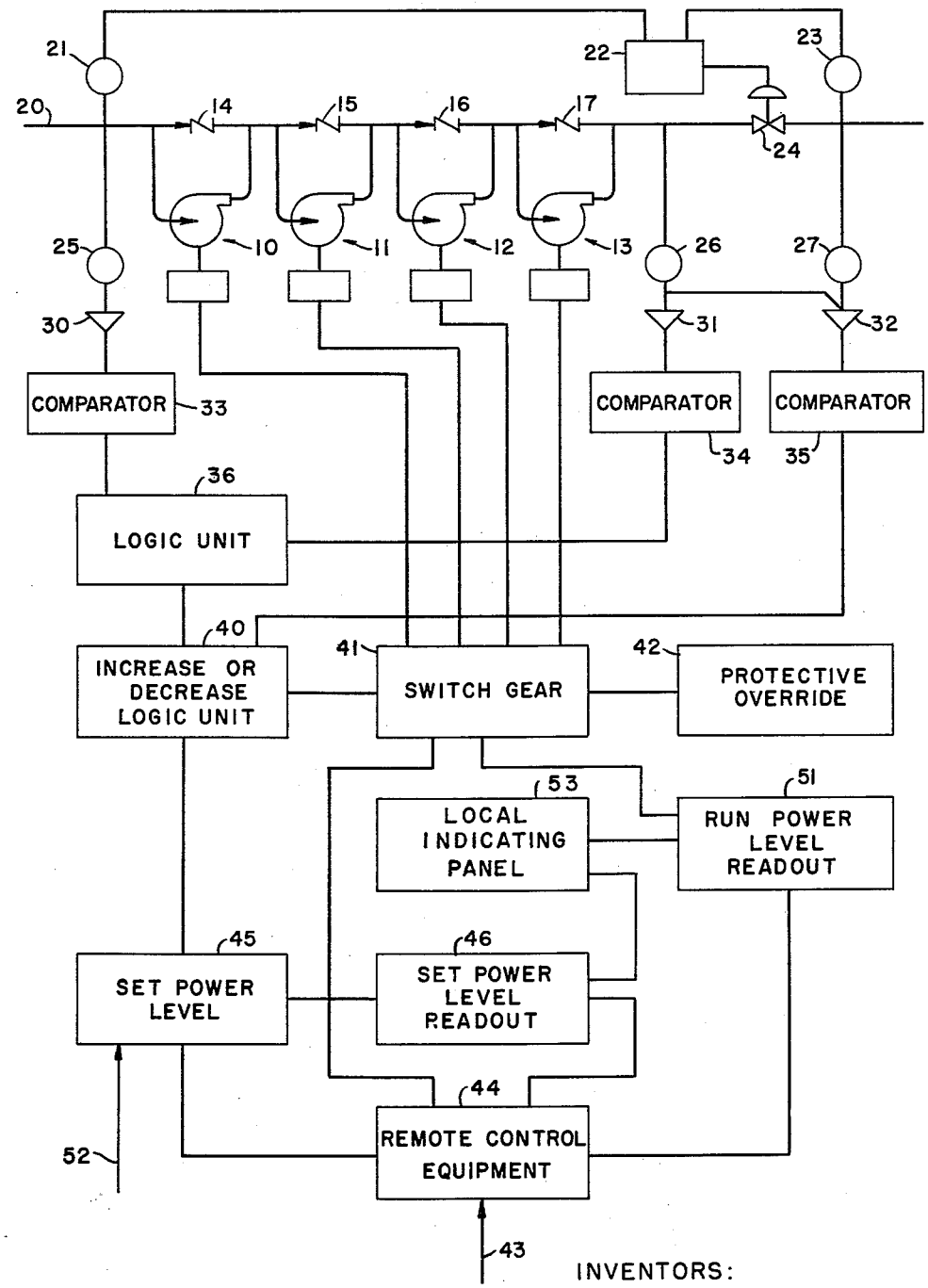
INVENTORS:
JACKSON R. BABBITT
ROBERT D. PFLUGER
BY: *Theodore E. Bieber*
THEIR ATTORNEY 3,068,796
POWER LEVEL CONTROLLER
Robert D. Pfluger and Jackson R. Babbitt, Houston, Tex., assignors to Shell Oil Company, a corporation of Delaware
Filed Nov. 20, 1959, Ser. No. 854,289
7 Claims. (Cl. 103—11)

This invention pertains to a system for automatically controlling the operation of a pipeline pump station to maintain the station at a desired operating power level.

A pipeline pump station consists of a number of pumping units of different sizes or capacity; thus it is possible to add to the hydraulic power level of the pipeline as it passes through the pump station in small increments. The various pumping units of the station are started and stopped to maintain the flow rate as nearly as possible at a desired level. The number of pumping units required to maintain the desired flow rate is known as the power level of the stations and is directly related to the hydraulic power added to the pipe line by the station. In the past, the operation of starting and stopping of pumping units at a pump station has been done either by an operator or by remote control from a master station. While both of these methods are satisfactory they both have disadvantages. The use of manual operations, of course, necessitates the presence of an operator whenever the station is operated. The remote control of a station eliminates the need for an operator but renders the operation dependent upon the maintenance of communication between the remote location and the station. This is an unsatisfactory arrangement since communiaction may be lost at the same time that an upset may occur in a pipeline which necessitates the starting and stopping of pumping units at various pump stations. Considerable loss of thruput as well as possible damage can result from such an upset and it will be impossible to prevent it unless communication between the remote location and the station is reestablished.

The automatic controller of this invention would eliminate the above problems by automatically starting and stopping the pumping units in order to maintain the power level of the pump station at the power level set either by remote or local means. The control system of this invention compensates for the upsets occurring in the pipeline by stopping pumping units and then restarting them after the upset has passed. Thus the controller will eliminate the need for an attendant and will maintain the desired thruput regardless of whether communications are maintained or not.

Accordingly, it is the principal object of this invention to provide an automatic power level controller for a pipeline pump station which will maintain the power level of the pump station at substantially a predetermined power level.

A further object of this invention is to provide a power level controller which will maintain the power level of a pipeline station at a preset power level while operating the station within the hydraulic limits of the pipeline and at its most economical level.

The above objects and advantages are accomplished by providing a control system which continually monitors the hydraulic conditions existing in the pipeline as it passes through a pump station and then utilizes the information obtained to determine the proper power level and to start or stop pump units to maintain the station at the determined power level. The information is used to determine whether hydraulic space is available in the pipeline to insure that the hydraulic power added to the pipeline by additional units will not exceed the capacity of the pipeline. The system will continue to add to the hydraulic power level of the pipeline until power level of the station substantially equal the preset power level at which point it will cease to add to the hydraulic power level of the pipeline. While the system will continue to add to the hydraulic power level of the pipeline it will not exceed the hydraulic limits of the pipeline by any large amount, that is, it will not increase the discharge pressure of the pump station above the maximum allowable pipeline pressure regardless of whether it reaches the preset power level or not. The term power level as explained above refers to the power being supplied to the fluid as it passes through the pump station by the operating unit of the pump station. The power being supplied will depend on the rated power of the operating units and in the case of constant speed units will be related to the actual number of units operating. Of course, with variable speed units the power level will depend on the rated power of the operating units for the particular speed at which they are operating.

The above objects and advantages of this invention will be more easily understood from the following detailed description of a preferred embodiment when taken in conjunction with the attached drawing showing a block diagram of a preferred embodiment of this invention.

Referring now to the drawing, there is shown a typical pipeline pump station utilizing four pumping units, 10, 11, 12 and 13. These pumping units, as explained above, are of different size or capacity; thus, it is possible to increase the power level of the station in small increments until the maximum power level of the station is reached. Each pump is disposed to take a suction from the pipeline and discharge back to the pipeline with check valves 14, 15, 16 and 17 being disposed between the respective suction and discharges of the pump units.

A transducer element 21 measures the suction or inlet pressure of the pipeline 20 to the pump station and supplies a signal to a pressure controller 22. The discharge or outlet pressure of the pipeline from the booster station is measured by a transducer 23 which also supplies a signal to the pressure controller 22. The pressure controller 22 utilizes the signals representing the suction and discharge pressures to control the position of flow valve 24 to maintain the pressure in the pipeline 20 within the allowable minimum suction and maximum discharge pressures.

A second transducer 25 also measures the suction or inlet pressure of the pipeline 20 and supplies a signal to an amplifier 30. Similar transducers 26 and 27 are disposed to measure the discharge pressure from the pump units and the outlet pressure of the pump station, respectively. The signal from the transducer 26 is coupled to an amplifier 31 while the signals from both transducers 26 and 27 are coupled to amplifier 32. The amplifier 32 subtracts the signal from transducer 27 which represents the outlet pressure of the pump station from the signal from transducer 26 which represents the discharge pressure of the pump units and supplies the difference signal to a comparing circuit 35. The signal from the amplifier 30 is coupled to a comparing circuit 33 for comparing the amplitude of the signal representing the suction pressure with a preset signal to determine whether or not the suction pressure exceeds the minimum required suction pressure for incrementation of the hydraulic power of the pipeline. The signal from the comparer 33 is supplied to a logic circuit 36 which also receives the signal from a comparing circuit 34. The comparing circuit 34 compares the signal from amplifier 31 representing the discharge pressure of the pump units with a preset signal to determine whether or not the discharge pressure of the pump units is below the maximum permissible pressure for incrementation of the hydraulic power of the pipeline. The comparing circuits 33, 34 and 35 described below are preferable circuits utilizing solid state devices that supply an output signal when the input signal equals or exceeds a fixed reference signal or set point. The logic circuit 36 is a simple "and" type of logic circuit which supplies an output whenever it receives a signal from both comparing circuits 33 and 34. The signal from the logic circuit 36 is supplied to a second logic circuit 40 which determines whether the power level of the booster station should be increased or decreased to meet the set power level.

The comparing circuit 35 compares the difference signal from amplifier 32 with a reference value signal representing a percentage, for example 75 percent, of the pressure boost of the smallest pump unit. If the difference signal exceeds the reference value the comparator 35 supplies a signal to the logic circuit 40 described below.

The logic circuit 40 receives signals from the logic circuit 36, the comparing circuit 35, a set power level signal from circuit 45, signals from switch gear 41 indicating which pump units are running and from the signals received determines whether the operating power level is to be increased or decreased. The circuit 45 determines the set power level of the station from a locally set control signal 52 or a signal 43 received by the remote control equipment 44. The local signal may normally be set at the station while the remote signal may be transmitted from a central control by microwave or telephone. The set power level circuit 45 is preferably a bi-directional counter which receives the local or remote signal and either raises or lowers the counter a count depending on the signal received. The signal from the switch gear 41 indicating which units are running is used to control a bi-directional counter in the logic circuit 40 to provide an operating power level. Of course, it is necessary to weight the various pump units according to size in order that the two bi-directional counters will indicate power levels in equal or equivalent increments.

The logic circuit 40 compares the operating power level it determines with the set power level received from the circuit 45 and determines that the two are equal and no action is required or that the operating power level must be either increased or decreased. Assume that the operating power level is below the set power level and that logic circuit 36 indicates that hydraulic space is available in the pipeline. In this case, logic circuit 40 will supply a signal to switch gear 41 to start an additional unit. This procedure will be repeated by the logic circuit 40 until the two power levels are equal or the available hydraulic space is filled. If the logic circuit 36 does not indicate that hydraulic space is available the logic circuit 40 will not start additional units but wait until circuit 36 indicates that space is available. In case the operating power level exceeds the set power level the circuit 40 will immediately shut down pump units until the operating level equals the set level.

When an upset occurs in the pipeline the transducers 21 and 23 and control 22 will position the flow control valve 24 to throttle the discharge of the pump units producing a pressure differential across the valve 24 known as throttle pressure. The throttle pressure which is determined by the amplifier 32 represents a waste of hydraulic power and the operating power level should be reduced in order to eliminate or reduce it to a minimum. As explained above, the comparing circuit 35 compares the throttle pressure signal with a signal representing 75 percent of the capacity of the smallest pump unit and generates a signal if the throttle pressure exceeds this value. This signal is supplied to the logic circuit 40 which then stops the smallest pumping unit.

In cases where the throttle pressure does not exceed the 75 percent value but does exceed a percentage, for example, 40 percent of the difference between the pressure corresponding to the operating power level and the pressure corresponding to the next lower power level the logic circuit 40 will decrease the power level to the next lower power level. This is accomplished by utilizing the logic circuit 40 to supply a signal to the comparing circuit 35 representing 40 percent of the pressure difference between the operating power level and the next lower power level. This reference signal is compared by the comparing circuit 35 to the throttle pressure signal and a signal transmitted to the logic circuit 40 if the throttle pressure signal exceeds the 40 percent reference signal. This signal starts a time delay relay in the logic circuit 40 which after the preset time will cause the logic circuit to transmit a signal to the switch gear 41 to start and stop the necessary units in order to decrease the operating power level to the next lower level.

The switch gear 41, of course, automatically starts or stops the pumping units in accordance with the signal received from the logic circuit 40. In addition, to control by the logic circuit 40 the switch gear 41 is also controlled by various protective devices which are illustrated diagrammatically at 42. These protective devices can be operated by various conditions such as low suction pressure, excessive discharge pressures, overheating of the driving motors, and various other protective devices. These protective devices are preferably of the automatic resetting type so that once the emergency has passed the pump units may be restarted by the switch gear.

In addition, the switch gear 41 supplies a signal to an operating power level circuit 50 indicating which of the individual pumping units are actually operating. This signal is then transmitted by a readout device to the remote control equipment 44 so that it may be retransmitted to the master control station and to the local indication panel 53. Thus, the operator at the master control station can easily ascertain both the set power level at the booster station and the actual power at which it is operating.

From the above description it is easily seen that the power level controller automatically starts and stops the pumping units of a pump station to maintain the station at a set power level if hydraulic conditions in the pipeline permit. While the controller maintains the station at a set power level, it will not add pumping units to the pipeline unless hydraulic space is available in the pipeline. Likewise, it will remove units from the pipeline if an upset occurs in the pipeline which reduces the hydraulic space available or results in a waste of hydraulic power. The control system accomplishes the above results by measuring physical quantities such as pressures in the pipeline which reflect the hydraulic conditions in the pipeline to control the pump units. The measured physical quantities are utilized by logic circuits to determine whether the station power level should be raised and if it is possible to do it within the hydraulic limits of the pipeline. The logic circuits also utilize these measured quantities to correct the power level of the booster station for any upset which may occur. The only information which must be supplied to the controller is the set or desired power level at which the station is to operate and this may be done locally or by remote control. Once the power level is set, the controller will operate automatically to maintain the station at the set power level. While the control automatically controls the power level of the station, it does not replace the protection devices of the station and thus the station is protected from abnormal conditions.

While the above description pertains to a preferred embodiment, various changes can be made without departing from the broad spirit and scope of this invention. For example, various designs of logic circuits may be used other than those disclosed.

We claim as our invention:

1. A system for controlling the operation of a pipeline pump station to maintain said station substantially at a set power level comprising: a pipeline; a plurality of individual pump units, each of said pump units having a switch gear unit; said pump units being disposed to circulate a fluid through the pipeline; first circuit means in the form of a bi-directional counter, said first circuit means being responsive to a signal transmitted to the pump station for establishing a set power level for the station; transducer means for monitoring the hydraulic conditions of the fluid flow through the pipeline at the station and supplying signals proportional to the monitored conditions; a comparing unit, said comparing unit being coupled to said first circuit means and said transducer means for comparing said signals with a predetermined signal representing a set point, said comparing circuit being coupled to a logic circuit to supply a control signal to the logic circuit; said logic circuit comparing said control signal with set power level signal to supply a pump unit control signal, said logic circuit being coupled to the switch gear unit of the pump units of the pump station whereby the pump unit control signal will control the operation of the pump units in accordance with said power level and within the preset hydraulic limits of the pipeline.

2. A method of controlling a pipeline pump station to maintain its hydraulic power level near a set power level comprising: sensing a first set of hydraulic conditions which indicates the ability of the pipeline at the station to absorb additional hydraulic power; sensing a second set of conditions which indicate the power being supplied by the station to the pipeline; utilizing said second set of conditions to determine the required adjustment of the power supplied by the station for the station to approach the set power level of the station; adjusting the power level of the station in accordance with said determination and maintaining the power level of the station substantially within the hydraulic capacity of the pipe line at the station as determined from said first set of conditions.

3. A system for controlling the power supplied to a pipeline by a pump station having a plurality of pump units to maintain said supplied power substantially equal to a preset level comprising: a pipeline; a plurality of individual pump units, each of said pump units having a switch gear unit, said pump units being disposed to circulate a fluid through the pipeline; transducer means for measuring and converting to usable signals the pump inlet, pump discharge and outlet pressures of the fluid in the pipeline as it passes through the station; a first comparing unit coupled to the transducer means for comparing the usable signals for the pump inlet and discharge pressures with preset levels to provide a command signal for increasing the number of pump units operating in accordance with the hydraulic capacity of the pipeline available; a second comparing unit coupled to the transducer means for comparing the usable, signals for the pump discharge and outlet pressures with preset levels to provide a command signal for decreasing the number of pump units operating in accordance with the excess of hydraulic power over the hydraulic capacity of the pipeline; a third comparing unit in the form of bi-directional counter, said third comparing unit being disposed to receive a predetermined power level signal and compare said predetermined power level with actual power level of the station as indicated by the number of pump units operating to supply a power level demand signal; a logic circuit coupled to said first and second comparing units and disposed to compare said increasing and decreasing command signals with the power level demand signal received from said third comparing unit to generate pump starting and stopping signals and switch gear coupled to said logic circuit and responsive to said starting and stopping signals to start and stop the pump units.

4. A method for controlling a pipeline pump station having a plurality of different size pump units comprising: establishing a set operating level at which it is desired to operate said station; determining the inlet pressure of the pipeline at the station and comparing it with a first preset pressure to generate a first signal when the inlet pressure exceeds the first preset pressure; determining the discharge pressure of the pump units at the station and comparing it with a second preset pressure to generate a second signal when the second preset pressure exceeds the discharge pressure; generating a first control signal when both said first and second signals exist simultaneously determining the actual operating level of the station, comparing the actual operating level with the set operating level to determine the need for additional pump units; starting the additional pumping units providing both the first control signal and need exist; controlling upsets in the pipeline by determining the throttle pressure of the station, comparing the throttle pressure with a set percentage of the pressure boost of the smallest pump unit of the station and generating a second control signal when the throttle pressure exceeds the percentage pressure; stopping the smallest pump unit in response to said second control signal; further controlling upsets in the pipeline by generating a third control signal whenever the throttle pressure exceeds a set percentage of the difference between the actual operating level and the next lower operating level and adjusting the pumping units to operate at the next lower level in response to the third control signal.

5. A method for controlling a pump station during an upset condition in a pipeline comprising: sensing both the discharge pressure of the pump units of the station and the outlet pressure of the station, obtaining the difference between the sensed pressures to determine the throttle pressure of the station; comparing the throttle pressure with a set percentage of the pressure boost of the smallest pump unit and a set percentage of the pressure difference between the operating power level of the station and the next lower power level and generating an upset signal when the throttle pressure exceeds either of the set percentages and utilizing the upset signal to reduce the power level of the station.

6. An apparatus for controlling a pump station during an upset condition in a pipeline comprising: a pipeline; a plurality of individual pump units, each of said pump units having a switch gear unit, said pump units being disposed to circulate a fluid through the pipeline; transducer means for sensing the discharge pressure of the station pump units and the outlet pressure of the pipeline at the station and supplying electrical signals proportional to the sensed pressures; said transducer means being coupled to a difference amplifier, the output side of said amplifier being coupled to a comparing unit means; a logic unit means for supplying a first reference signal representing a predetermined percentage of the pressure boost of the smallest pump unit and a second reference signal representing a predetermined percentage of the pressure difference between the operating power level of the station and its next lower power level; said logic unit being coupled to said comparing unit means; said comparing unit means comparing the difference between said pump discharge pressures and the station outlet pressure with said first and second reference signals and supplying a control signal whenever the output signal of the difference amplifier exceeds either said first or second reference signals; said comparing unit being coupled to the pump units to permit said control signal to effect a reduction in the operating power level of the station.

7. A method for controlling the power supplied to a pipe line by a pump station having a plurality of pump units to maintain said supplied power within a range of a preset power level, said method comprising:
sensing and converting to usuable signals conditions of the fluid flow as it passes through said station;
comparing the usable signals with preset signal levels to develop command signals for controlling the number of pump units operating;
sensing the operating power level of the pump station, comparing the operating power level of the pump station with the preset power level to develop a power level demand signal; said power level demand signal being developed in conformity with said command signal; and controlling the operating pump units of the pump station in response to the power level demand signal.

References Cited in the file of this patent

UNITED STATES PATENTS

| | | |
|---|---|---|
| 2,309,415 | Pearson | Jan. 26, 1943 |
| 2,888,875 | Buck | June 2, 1959 |
| 2,938,536 | Ehrenberg | May 31, 1960 |